United States Patent

Melchior et al.

[11] Patent Number: 6,010,249
[45] Date of Patent: Jan. 4, 2000

[54] OPTICAL END PIECE AND METHOD FOR TESTING THE COUPLING SURFACE OF AN OPTICAL END PIECE

[75] Inventors: Lutz Melchior, Berlin; Detlef Klix, Biesenthal, both of Germany

[73] Assignee: Siemens Aktiengesellschaft, Munich, Germany

[21] Appl. No.: 09/105,229

[22] Filed: Jun. 26, 1998

[30] Foreign Application Priority Data

Jun. 26, 1997 [DE] Germany ............... 197 27 956

[51] Int. Cl.⁷ .................................................. G02B 6/36
[52] U.S. Cl. ............................................................ 385/77
[58] Field of Search .............................. 385/77, 78, 80, 385/81, 87, 86, 139, 63, 64, 32, 31, 43

[56] References Cited

U.S. PATENT DOCUMENTS

| | | | |
|---|---|---|---|
| 4,168,108 | 9/1979 | Judeinstein | 385/63 |
| 5,013,110 | 5/1991 | Marazzi | 385/77 |
| 5,138,676 | 8/1992 | Stowe et al. | 385/32 |
| 5,214,730 | 5/1993 | Nagasawa et al. | 385/59 |
| 5,611,012 | 3/1997 | Kuchenbecker | 385/86 |

FOREIGN PATENT DOCUMENTS 0 712015 A2  5/1996  European Pat. Off. .

OTHER PUBLICATIONS

IEEE Electron Device Letters, vol. EDL–6, No. 6 (Campbell, P.M. et al.), dated Jun. 1985, pp.304–306.
International Publication WO 95/–7548 (Maier, R. et al.), dated Mar. 16, 1995.

Primary Examiner—Akm E. Ullah
Attorney, Agent, or Firm—Herbert L. Lerner; Laurence A. Greenberg

[57] ABSTRACT

The end piece holds one or more optical fibers and has a coupling surface. A misalignment of the coupling surface relative to a desired surface is indicated and detected with a simple mechanical device. During and after preparation of the coupling surface, the end piece has at least one test structure with two subareas which assume mutually different shapes if the coupling surface is prepared with a faulty alignment relative to the desired surface.

15 Claims, 6 Drawing Sheets

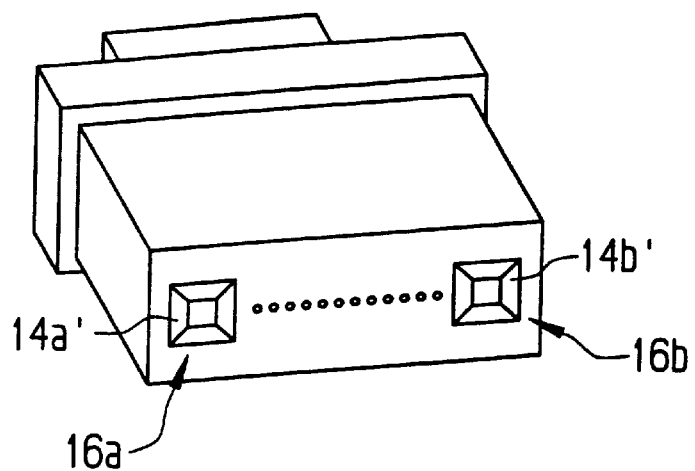
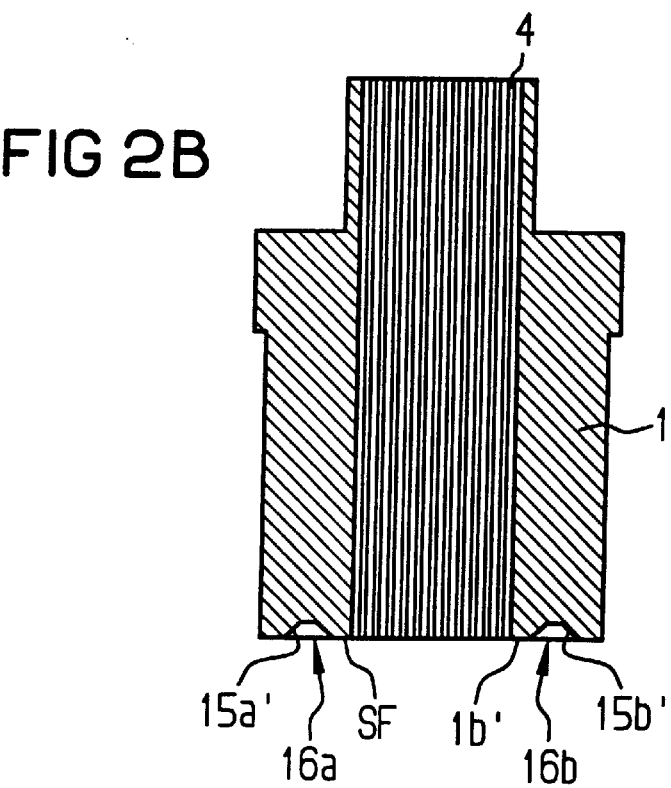
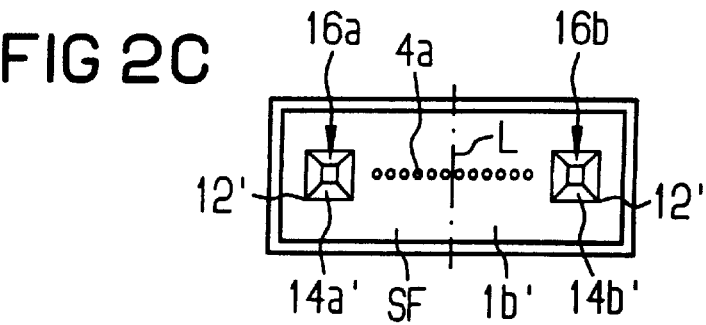

OPTICAL END PIECE AND METHOD FOR TESTING THE COUPLING SURFACE OF AN OPTICAL END PIECE

BACKGROUND OF THE INVENTION

Field of the Invention

The invention pertains to single-channel and multi-channel optical connections. Such connections are implemented with optical end pieces for connecting one or more optical fiber ends in a coupling fashion. Within the scope of the present invention, an optical fiber is to be understood as a conductor suitable for guiding and relaying an optical signal, such as, for example, an optical fiber assembly, optical fiber ribbons or optical conductors constructed on a substrate (so-called waveguides).

More particularly, the invention relates to an optical end piece for endwise connection of one or more optical fibers, having a coupling surface at which the optical fiber or fibers terminate.

Such an end piece—described in U.S. Pat. No. 5,214,730 to Nagasawa et al. (EP 0 712 015 A2)—holds several optical fiber ends arranged in parallel in a common plane. The end faces of the optical fibers, which serve the purpose of optical coupling, lie in a common coupling surface of the end piece, which is also denoted as a coupling member or ferrule. It is possible via the end face to launch optical signals of a coupling partner into the respective optical fiber and/or to couple out optical signals guided in the respective optical fiber to a coupling partner. Because of the comparatively small dimensions of the light-conducting core cross sections in optical fibers, optimum alignment of the coupling partners relative to one another is important for low coupling losses, that is to say for a high so-called coupling efficiency. In accordance with U.S. Pat. No. 5,214,730, it is desirable to have an aligned, direct body contact of the optical fiber end faces on the side of the coupling partners, particularly in the case of optical coupling of two similar end pieces each having several optical fiber ends. Proposed for this purpose are, inter alia, specially shaped (e.g. cambered, domed) coupling surfaces and the application of adequate axial compressive forces.

However, this still leaves unsolved the problem, which occurs with end pieces both for a single optical fiber end and for several optical fiber ends (also denoted as multiple connectors or MT ferrules), of constructing the coupling surface exactly at right angles to the optical fiber ends and the endpiece geometry in particular of the aligning means or aligning surfaces of the end piece. Whereas in the case of circular cylindrical connectors having only one optical fiber end and thus one punctiform, central coupling contact, it is possible to circumvent this problem by rounded grinding of the connector pin end face (coupling surface), in the case of an elongated coupling surface it is necessary, in particular, to ensure that the coupling surface is situated at a correct angle in the surface desired after processing of the coupling surface, or in the desired plane in the case of plane coupling surfaces. Specifically, if after endside preparation of the end piece the coupling surface is produced 'askew', that is to say not parallel to the desired surface, the coupling efficiency is substantially worsened. In the worst case, optical transmission is even impossible. Thus, for example, in the case of a desired direct contact between the coupling surfaces on the side of the coupling partners, it is possible, in addition to partial contact, for an undesired air gap to be produced in the remaining region between the two coupling surfaces because of a coupling surface, of one of the coupling partners, which has angle faults.

SUMMARY OF THE INVENTION

It is accordingly an object of the invention to provide an optical end piece and a method of testing the coupling surface of an optical end piece, which overcomes the above-mentioned disadvantages of the prior art devices and methods of this general type and which makes it possible to detect a deviation (fault angle) of the coupling surface produced from a prescribed desired surface by simple means during and after the formation and/or treatment of the coupling surface.

With the foregoing and other objects in view there is provided, in accordance with the invention, an optical end piece for endwise connection of one or more optical fibers, comprising:

an end piece body defining a coupling surface for optically coupling one or more optical fibers;

a test structure formed on the end piece body, the test structure having at least two subareas, the at least two subareas enclosing a mutually equal angle in absolute value with a desired surface, the angle being different from 90°;

the coupling surface being parallel to the desired surface when the coupling surface is constructed without angle faults, and the at least two subareas being different from one another when the coupling surface is constructed with angle faults.

In other words, the objects of the invention are satisfied by providing on the end piece one or more test structures with at least two subareas. Both subareas are oriented at a given angle to a desired surface which is the same in absolute value and different from 90°. The coupling surface is produced properly parallel to the desired surface when the coupling surface is constructed without angle faults (parallel includes coextensive), and the subareas are different when the coupling surface is produced with angle faults. It is preferred for the test structures to be already constructed in the region of the coupling surface using molding technology during the production of the end piece, which is preferably constructed as a precision plastics molding. This permits the test structure to be constructed in an extremely precise and reproducible fashion with reference to the axes of the optical fiber ends and/or the surface normal of the desired surface. After the optical fiber ends have subsequently been inserted and fixed, the coupling surface is produced or prepared, for example by means of severing, polishing and/or other or supplementary, for example also micromachining methods, in such a way that at least the coupling-relevant region including the optical fiber end faces is situated in the desired surface.

However, faulty angles occurring as a consequence of defective preparation lead to an actual position of the coupling surface, also designated as skew in this case, which deviates from the desired position. Defective preparation also influences the test structure terminating on the coupling surface, thus producing an easily detectable different processing at least of the subareas of the test structure which are to be evaluated.

A substantial advantage of the end piece according to the invention therefore consists in that an emerging faulty position of the coupling surface can be detected and, if appropriate, corrected as early as during the preparation (for example during the polishing process). The test structure advantageously permits simple evaluation both with the naked eye and by measurement, with the result that it is immediately rendered possible both to make a qualitative statement—as to whether the coupling surface is situated in or outside the desired surface—and, if required, to determine the faulty angles.

In accordance with an added feature of the invention, the test structure comprises two substructures. The two substructures are preferably disposed symmetrically relative to a longitudinal symmetry plane of the desired surface. This embodiment leads to a particularly improved ability to detect a defectively processed coupling surface.

In accordance with an additional feature of the invention, the test structure is at least one cutout formed in the end piece body or at least one projection formed on the end piece body. Where the test structure is formed by projections, the test structure or the substructures can be constructed as far as possible independently of the further nature of the end region of the end piece surrounding the coupling surface.

Test structures or substructures which have the shape of a pyramid or pyramidal frustum or of a cone or conical frustum have proved to be particularly advantageous with regard to the ease with which it is possible to detect a coupling surface constructed askew.

In accordance with another feature of the invention, projection or cutout depression is adapted to hold centering means. The cutouts can thereby fix centering means, or they can cooperate with centering means of a coupling partner during the coupling operation.

In accordance with a further feature of the invention, the test structure may have a shape selected from the group of shapes consisting of pyramid, pyramidal frustum, cone and conical frustum. A particularly preferred embodiment has a test structure in the form of a cone or conical frustum. In the event of defective preparation of the coupling surface, the subareas of the conical shape which intersect the straight line at the largest faulty angle would be processed most differently. To be precise, instead of the circular top or bottom surface of the conical frustum—circular in the case of faultless processing—the result in this case is an elliptical surface whose relatively long major axis permits an inference to be drawn concerning the largest faulty angle.

With the above and other objects in view there is also provided, in accordance with the invention, a method of testing a coupling surface of an optical end piece for coupling optical fibers, for ascertaining a proper alignment of the coupling surface with reference to a desired surface, the method which comprises:

providing an optical end piece with at least one test structure;

forming a coupling surface of the optical end piece and simultaneously processing at least two subareas of the at least one test structure; and shaping the subareas such that the at least one test structure indicates an optically detectable fault display if the coupling surface produced in the forming step deviates from a proper alignment with the desired surface due to angle faults.

Other features which are considered as characteristic for the invention are set forth in the appended claims.

Although the invention is illustrated and described herein as embodied in an optical end piece and method for testing the coupling surface of an optical end piece, it is nevertheless not intended to be limited to the details shows, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2A, 2B, and 2C, are views similar to FIGS. 1A, 1B, and 1C, respectively, of a similar end piece with a coupling surface constructed without angle faults;

DESCRIPTION OF THE PREFERRED EMBODIMENTS

Figure 1A:
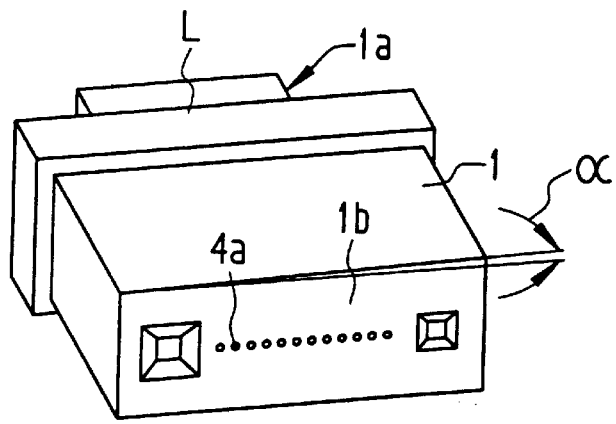
FIG. 1A is a perspective view of an end piece according to the invention with an erroneously constructed coupling surface.
Figure 1B:
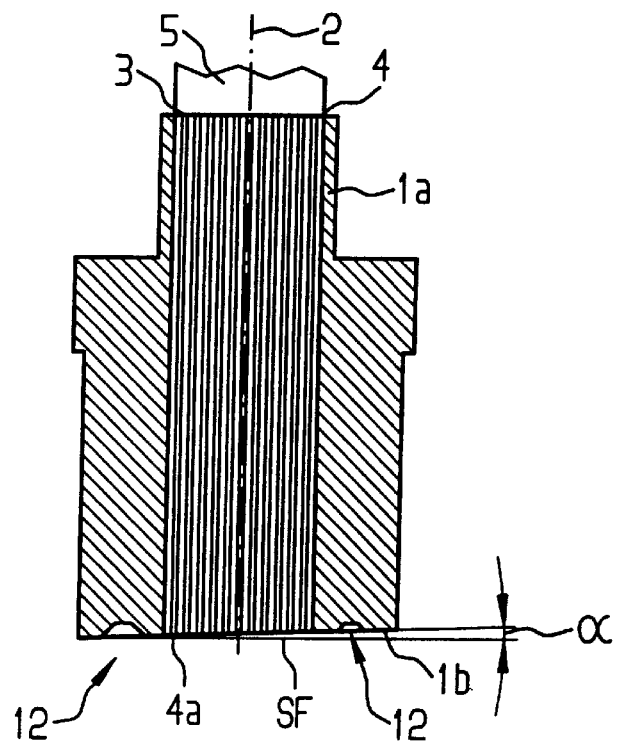
FIG. 1B is a longitudinal section thereof.
Figure 1C:
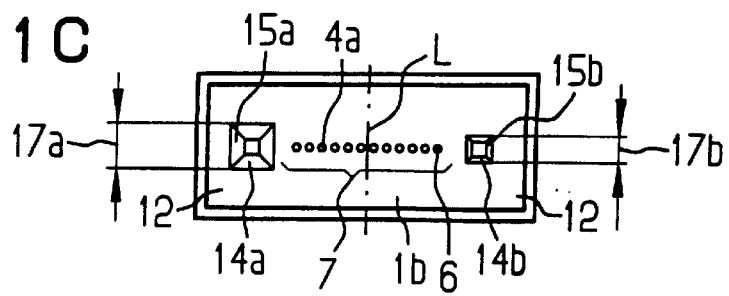
FIG. 1C is an elevational view of the end face.

Referring now to the figures of the drawing in detail and first, particularly, to FIGS. 1A to 1C thereof, there is seen an end piece with a coupling member 1 which is a plastics member produced using precision injection molding and having a multiplicity of parallel bores 3 which penetrate in the direction of its longitudinal axis 2 and serve to hold an equal or lesser number of optical fibers 4. The optical fibers 4 emerge from a rear end 1a of the end piece 1 and run, for example, in a common optical fiber ribbon 5. The optical fibers 4 held by the end piece 1 end with their coupling side end faces 4a at a coupling surface 1b of the end piece 1. The coupling surface 1b can be structured for direct bodily contact with a coupling partner, such as is described in detail, for instance, in the above-mentioned U.S. Pat. No. 5,214,730, which is herewith incorporated by reference. However, a high-quality optical coupling requires that the coupling surface 1b come into physical contact with the corresponding coupling surface of the coupling partner at least along a line 6 passing through the centers of the end faces of the optical fibers, or in the coupling surface region 7 including the end faces. This is ensured only if the coupling surface is produced as stipulated—that is to say in a desired surface or desired plane—or is constructed at least parallel, but not askew with respect to the latter.

An end piece with a defectively prepared coupling surface 1b is first represented in FIGS. 1A to 1C for the purpose of a closer explanation of the problem on which the invention is based. FIG. 1B shows with particular clarity that an angle $\alpha \neq 0$ is enclosed between the actually constructed coupling surface 1b and the desired surface SF (the surface or plane in which the desired coupling surface should ideally lie). In the present case, the coupling surface 1b is therefore also denoted as being askew. Because of the usually very slight dimensions encountered in optical jointing, such a construction of the coupling surface with angle faults cannot be detected straight away, but in the most unfavorable case does not become noticeable until final testing or owing to poor coupling efficiencies during operation.

According to the invention, the end piece has a test structure 12 which in the first exemplary embodiment comprises two depressions (substructures) 14a, 14b in the shape of pyramidal frustums and disposed symmetrically relative to the longitudinal symmetry plane L of the desired surface SF. The longitudinal symmetry plane L is perpendicular to the desired surface SF. Each substructure 14a, 14b comprises a subarea 15a, 15b; the two subareas are mirror-symmetric and opposite relative to the longitudinal symmetry plane L. The subareas 15a, 15b thereby in each case enclose with the desired surface SF the same angle in absolute value, which is different from 90°. In the case of defective preparation of the coupling surface 1b, the oblique subareas 15a, 15b are abraded to different extents. As is clear, in particular, from the endface views in FIGS. 1A and 1C, the result is to produce from the originally similar substructures subareas 15a, 15b which reach different depths. Consequently, the respective bottom surface of the depression 14a, 15b resembling a pyramidal frustum is represented in a distorted and recognizably different fashion. In this way, defective processing can be detected even during the preparation process.

FIGS. 2A to 2C show an end piece which agrees in concept with the end piece represented in FIGS. 1A to 1C; here, however, the coupling surface has been processed without faults. Consequently, the desired coupling surface 1b' lies in the desired surface SF (desired plane), with the result that the end faces 4a of the optical fiber 4 actually all lie in the "ideal" coupling surface. The test structure 12' with substructures 14a', 14b' in the shape of pyramidal frustums and constructed symmetrically relative to the longitudinal symmetry plane L is constructed in the way previously described. The oblique surfaces 15a', 15b' have been abraded (shortened) to the same extent during the faultless preparation of the end face, resulting in the symmetrical endface image of the end piece, which is to be seen in FIG. 2C, for example. The similar geometry of the remaining substructures 14a', 14b' and, in particular, their bottom surfaces 16a, 16b can be detected with the naked eye, with the result that it is possible at least qualitatively to reach a direct conclusion on an angularly correct construction of the coupling surface 1b'. The boundaries of the bottom surfaces 16a, 16b of the substructures 14a, 14b, the dimensions of which are shown by 17a and 17b in FIG. 1C, can be used to derive the defectiveness with the aid of measuring techniques. The angle fault can be determined therefrom, given knowledge of the original substructure geometry.

Figure 3:
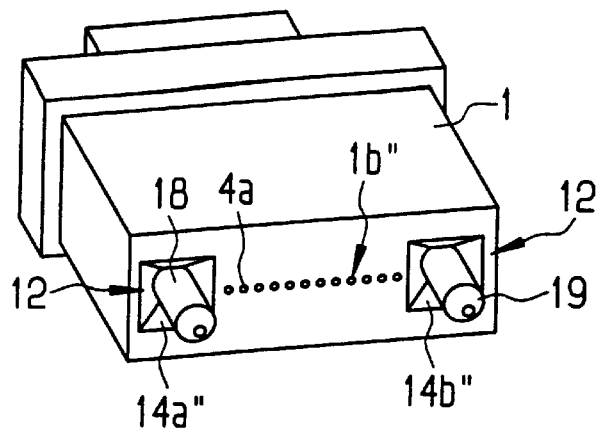
FIG. 3 is a perspective view of a further end piece.

FIG. 3 shows a modification of the previously described exemplary embodiment to the extent that, after preparation of the coupling surface 1b", aligning means in the form of centering pins 18, 19 are inserted directly into the substructures 14a" and 14b" in bores (no longer recognizable). The substructures advantageously thereby serve as an aid to threading in the aligning means; the test structure imposes no additional space requirement in the end region of the end piece.

Figure 4:
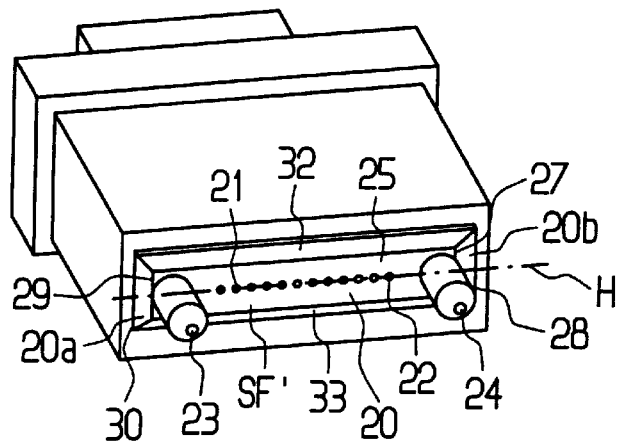
FIG. 4 is a perspective view of an end piece with a raised test structure.

Whereas in the previously described exemplary embodiments the test structure is constructed as depressions whose bottom surfaces end at the coupling surface, FIG. 4 shows an alternative exemplary embodiment in which the test structure is a projection 20. Centering means 23, 24 are inserted (after processing of the coupling surface 25) on both sides of a line 21 on which the optical fiber end faces 22 lie. On at least two opposite sides, the projection 20 has two subareas 20a, 20b which enclose with the desired surface SF' for the coupling surface 25 an angle which is the same in absolute value. Here, as well, in the case of defective preparation of the coupling surface the principle, on which thae invention is based, of a nonuniform final shape of the test structure or of the subareas 20a and 20b, respectively, comes to bear. In the case of a construction of the coupling surface 25 which is oblique relative to the desired surface SF' (as represented in FIGS. 1A to 1C), the boundary lines 27, 28 of the subarea 20b would, for example, move closer together than the corresponding boundary lines 29, 30 of the subarea 20a. This can easily be detected by viewing the end face of the end piece. For the case in which tilting of the coupling surface 25 about a horizontal axis H is also to be feared, the test structure 20 can also have corresponding subareas 32, 33. In the case where processing about the axis H is askew, the boundary lines of the subareas 32 and 33 would correspondingly move closer together at different spacings.

Figure 5:
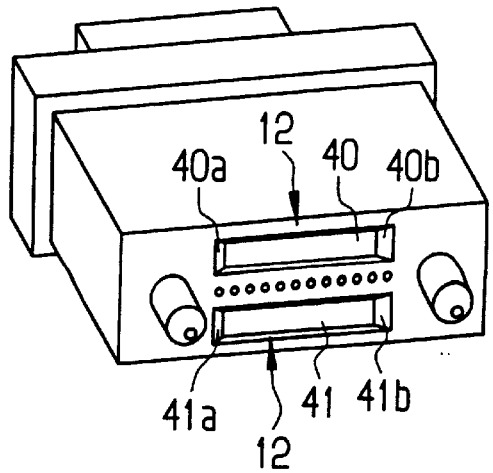
FIG. 5 is a perspective view of a further embodiment of an end piece with an alternative test structure.

FIG. 5 shows an embodiment of an end piece according to the invention in which the test structure is formed for the purpose of particularly fine resolution from two elongated troughlike depressions 40, 41. Each of the depressions 40, 41 has oblique subareas, for example 40a, 41a; 40b, 41b running up to one another in each case in a mirror-symmetrical fashion.

Figure 6A:
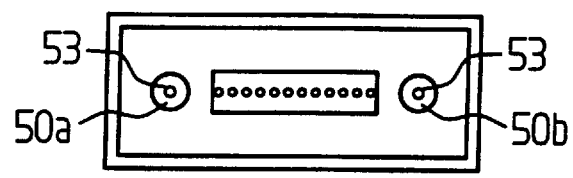
FIG. 6A is a perspective view of an end piece with a test structure in the shape of a conical frustum.
Figure 6B:
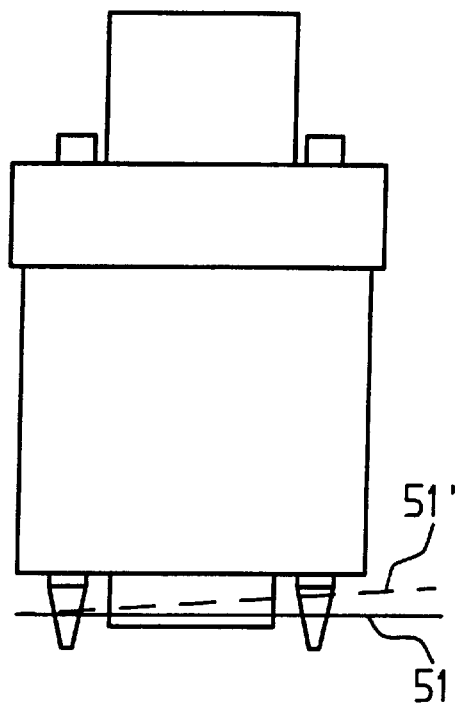
FIG. 6B is a side elevational view thereof.
Figure 6C:
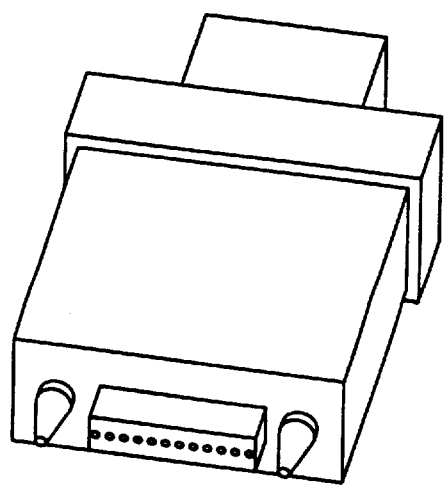
FIG. 6C is a side elevational view thereof.

Test structures in the shape of a cone or conical frustum, whose longitudinal axis is perpendicular to the desired surface, prove to be very suitable. The test structure can also be formed by a single projection or depression in the shape of a cone or conical frustum. Moreover, as FIGS. 6A to 6C show diagrammatically, provision is made of projections 50a, 50b which are in the shape of conical frustums and as indicated by line 51 in FIG. 6B are also processed in a following polishing operation of the coupling surface 52. In the case of defective preparation, it would be possible to detect two identical circular top surfaces which would be produced parallel to the original top sides 53a, 53b of the conical frustums 50a, 50b.

Figure 7A:
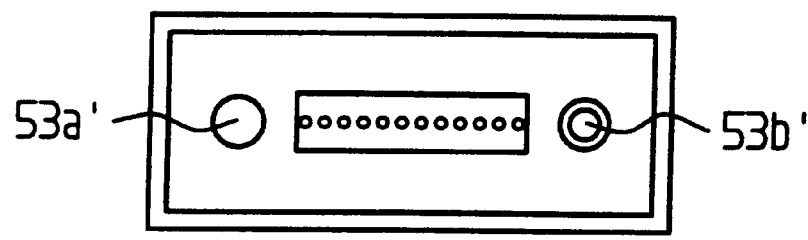
FIG. 7A is an end elevational view of the end piece of FIGS. 6A to 6C after (defective) processing of the end face.
Figure 7B:
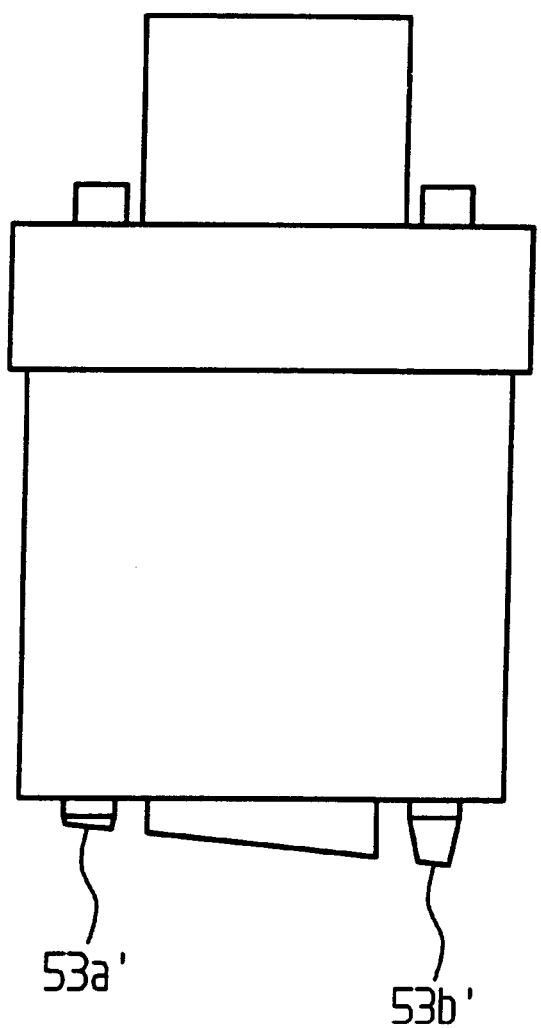
FIG. 7B is a side elevational view thereof.

FIGS. 7A and 7B show the previously described end piece with the test structures 50a, 50b after defective processing of the end face. To be detected because of the skewed processing (along the line 51' represented by dashes in FIG. 6B) are material abrasions of different size in each case, which lead to top surfaces 53a' and 53b' of different size. This makes it easy to infer defective preparation of the coupling surface.

In a corresponding way, given a conical or frustoconical test structure constructed as a depression, the bottom surface of the conical frustum would assume a different size in the case of defective preparation.

Figure 8A:
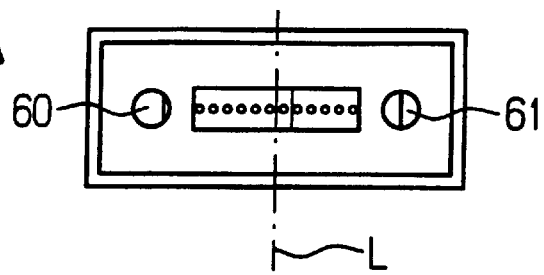
FIGS. 8A to 8C are perspective, side elevational, and end elevational views of a further embodiment of an end piece after preparation of the end face.
Figure 8B:
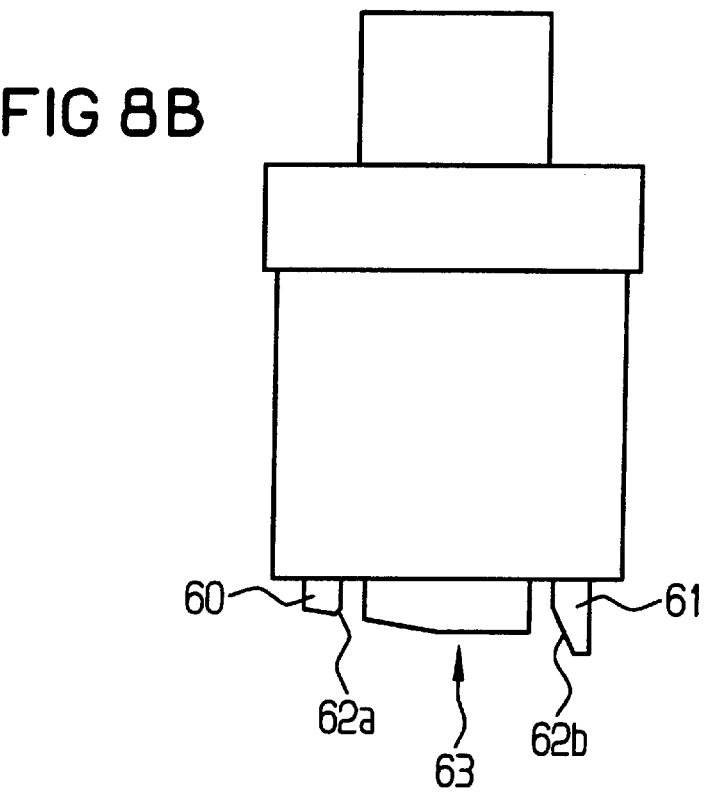
Figure 8C:
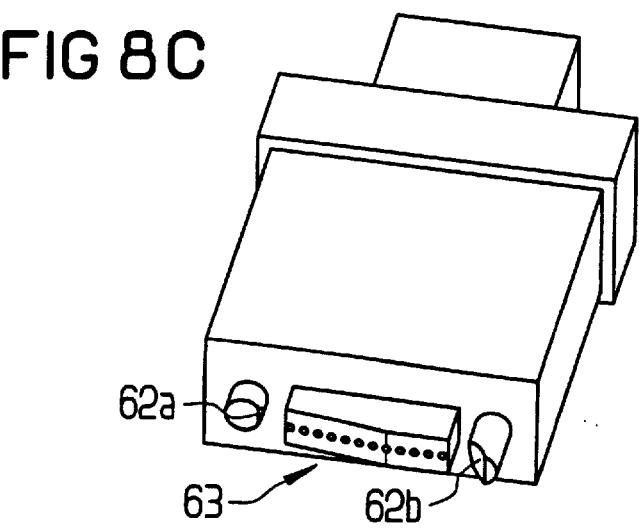

FIGS. 8A to 8C show a further variant, in which two chamfered cylindrical pins 60, 61 are provided as test structure, each having a skew chamfer with longitudinal mirror symmetry. The two subareas (chambers) which enclose the same angle in each case with the desired surface are denoted by 62a, 62b in the figures. In the case of defective processing (as represented) of the coupling surface 63, the substructures 60, 61 assume the shape represented in FIG. 8B. In the case of a symmetrical arrangement relative to the longitudinal symmetry plane L and an identical configuration of the substructures 60, 61, both surfaces 61a, 61b have the same shape only given defective processing of the coupling surface 63. This can also be determined easily.

When producing an optical end piece and testing the coupling surface thereof, for example in accordance with FIGS. 2A to 2C, the first step is to produce the end piece 1 from plastic using the precision injection molding method. The end piece can be multipartite for the purpose of inserting the optical fibers 4 more easily (FIG. 2B). The optical fiber ends held parallel are inserted and fixed so far that their end faces terminate with the coupling surface of the end piece or emerge from the surface. Subsequently, the coupling surface is treated, for example, by polishing, in such a way that the optical fiber end faces lie in the desired surface. In this process, the test structure provided in the region of the coupling surface is also necessarily processed, at least the two subareas having a different shape in the case of defective preparation—that is to say construction of the coupling surface askew to the desired surface. The direct result of this is a test structure which indicates the defective preparation.

We claim:

1. An optical end piece for endwise connection of one or more optical fibers, comprising:

an end piece body defining a coupling surface for optically coupling one or more optical fibers;

a test structure formed on said end piece body, said test structure having at least two subareas, said at least two subareas enclosing a mutually equal angle in absolute value with a desired surface, said angle being different from 90°;

said coupling surface being parallel to the desired surface when said coupling surface is constructed without angle faults, and said at least two subareas being different from one another when said coupling surface is constructed with angle faults.

2. The end piece according to claim 1, wherein said test structure comprises two substructures.

3. The end piece according to claim 2, wherein said substructures are disposed symmetrically relative to a longitudinal symmetry plane of the desired surface.

4. The end piece according to claim 1, wherein said test structure is defined by at least one cutout formed in said end piece body.

5. The end piece according to claim 4, wherein said at least one cutout is adapted to hold centering means.

6. The end piece according to claim 4, wherein said at least one cutout has a shape selected from the group of shapes consisting of pyramid, pyramidal frustum, cone and conical frustum.

7. The end piece according to claim 1, wherein said test structure is at least one projection formed on said end piece body.

8. The end piece according to claim 7, wherein said at least one projection is adapted to hold centering means.

9. The end piece according to claim 1, wherein said test structure has a shape selected from the group of shapes consisting of pyramid, pyramidal frustum, cone and conical frustum.

10. The end piece according to claim 2, wherein said two substructures are cutouts formed in said end piece body.

11. The end piece according to claim 2, wherein said two substructures are two projections formed on said end piece body.

12. The end piece according to claim 11, wherein said two projections are adapted to hold centering mean;.

13. The end piece according to claim 2, wherein said test structure has a shape selected from the group of shapes consisting of pyramid, pyramidal frustum, cone and conical frustum.

14. The end piece according to claim 13, wherein said test structure is constructed to hold centering means.

15. A method of testing a coupling surface of an optical end piece for coupling optical fibers, for ascertaining a proper alignment of the coupling surface with reference to a desired surface, the method which comprises:

providing an optical end piece with at least one test structure;

forming a coupling surface of the optical end piece and simultaneously processing at least two subareas of the at least one test structure; and shaping the subareas such that the at least one test structure indicates an optically detectable fault display if the coupling surface produced in the forming step deviates from a proper alignment with the desired surface due to angle faults.

* * * * *